United States Patent
Bacon et al.

(10) Patent No.: US 7,548,940 B2
(45) Date of Patent: Jun. 16, 2009

(54) GENERATIONAL REAL-TIME GARBAGE COLLECTION

(75) Inventors: David F. Bacon, Sleepy Hollow, NY (US); Perry Chang, New City, NY (US); David Grove, Ridgefield, CT (US); Martin T. Vechev, Port Moody (CA)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 11/149,686

(22) Filed: Jun. 10, 2005

(65) Prior Publication Data

US 2006/0294165 A1 Dec. 28, 2006

(51) Int. Cl.
*G06F 17/00* (2006.01)
*G06F 13/00* (2006.01)

(52) U.S. Cl. ............... 707/206; 707/202; 707/205; 711/154

(58) Field of Classification Search .......... 707/103 R, 707/103 Y, 103 Z, 203, 205, 206; 717/108, 717/116, 140, 146–149, 151, 155; 711/103, 711/159, 170–173
See application file for complete search history.

(56) References Cited

U.S. PATENT DOCUMENTS

| | | | | |
|---|---|---|---|---|
| 5,321,834 A | * | 6/1994 | Weiser et al. | 707/206 |
| 5,845,298 A | * | 12/1998 | O'Connor et al. | 707/206 |
| 5,873,105 A | * | 2/1999 | Tremblay et al. | 707/206 |
| 5,900,001 A | * | 5/1999 | Wolczko et al. | 707/206 |
| 6,049,810 A | * | 4/2000 | Schwartz et al. | 707/206 |
| 6,081,665 A | * | 6/2000 | Nilsen et al. | 717/116 |
| 6,115,782 A | * | 9/2000 | Wolczko et al. | 707/206 |
| 6,125,434 A | * | 9/2000 | Willard et al. | 707/206 |
| 6,446,257 B1 | * | 9/2002 | Pradhan et al. | 717/154 |
| 6,763,440 B1 | * | 7/2004 | Traversat et al. | 711/159 |
| 6,799,191 B2 | * | 9/2004 | Agesen et al. | 707/206 |
| 6,892,212 B2 | | 5/2005 | Shuf et al. | |
| 7,069,281 B2 | * | 6/2006 | Garthwaite | 707/206 |

OTHER PUBLICATIONS

"List processing in real-time on a serial computer," Commun. ACM 21, 4 (Apr. 1978), 280-294; Henry G. Baker, Jr.*
1. "A Real-time Garbage Collector with Low Overhead and Consistent Utilization", (POPL '03, Jan. 15-17, 2003, ACM 1-58113-628-5/03/0001), pp. 285-298; Bacon et al.*
2. "List processing in real-time on a serial computer," Commun. ACM 21, 4 (Apr. 1978), 280-294; Henry G. Baker, Jr.*

* cited by examiner

*Primary Examiner*—Charles Rones
*Assistant Examiner*—Daniel Kuddus
(74) *Attorney, Agent, or Firm*—Scully, Scott, Murphy & Presser, P.C.; Gail Zarwick, Esq.

(57) ABSTRACT

Disclosed are a partial heap garbage collector, and a partial heap garbage collection method, that during collection checks the time remaining (or equivalently the time taken so far, or the work done so far) to complete the partial heap collection. In a preferred embodiment, the partial heap collection is guaranteed to complete within a fixed time interval. For example, this guarantee may be obtained by applying a worst-case execution time (WCET) and sizing a nursery so that complete evacuation of the nursery can always be achieved on time. As an alternative, a technique, referred to as syncopation, may be used to allow generational collection to be used despite variance in program behavior over the short time scales in which a nursery can be collected. Syncopation may be accomplished via allocation control or via collection control.

15 Claims, 7 Drawing Sheets

INTERACTION OF COMPONENTS IN A METRONOMIC VIRTUAL MACHINE.
PARAMETERS OF THE APPLICATION AND COLLECTOR ARE INTRINSIC;
PARAMETERS TO THE SCHEDULER ARE USER-SELECTED, AND ARE MUTUALLY DETERMINANT.

FOR A PROGRAM WITH ALLOCATION RATE $a$,
INTERPOSING A NURSERY REDUCES THE EFFECTIVE ALLOCATION RATE TO $a\eta$,
WHERE $\eta$ IS THE NURSERY SURVIVAL RATE.

TIME DILATION DUE TO GENERATIONAL COLLECTION CAUSES ADDITIONAL ALLOCATION DURING A MAJOR HEAP COLLECTION, BUT ATTENUATES ALL ALLOCATION BY THE SURVIVAL RATE $\eta$.

RELATIVE SPACE USAGE vs UTILIZATION. LOW ALLOCATION RATE: a=20MB/s

RELATIVE SPACE USAGE vs UTILIZATION. LOW ALLOCATION RATE: a=100MB/s

FIG. 8

MAXIMUM MUTATOR ALLOCATION RATE (MMAR) FOR THE EEMBC EMBEDDED BENCHMARKS RUNNING ON A 2.4 GHz PENTIUM PROCESSOR. ALLOCATION RATES CONVERGE AT INTERVALS ABOVE 1-3 MILLISECONDS

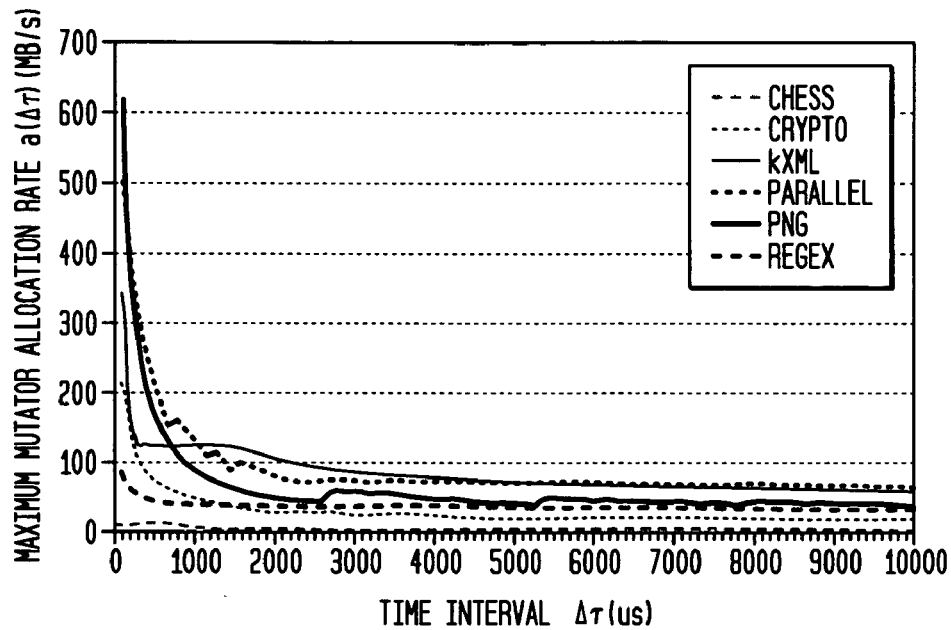

FIG. 9

NEED FOR SYNCOPATION (EEMBC CRYPTO BENCHMARK). WITH A VERY SHORT REAL TIME INTERVAL $\Delta\tau$= 100μs, THE APPLICATION ALLOCATES AS MUCH AS 250 MB/s IN SOME INTERVALS; AT $\Delta\tau$= 10000μs, THE PEAK ALLOCATION RATE DROPS TO 25 MB/s.

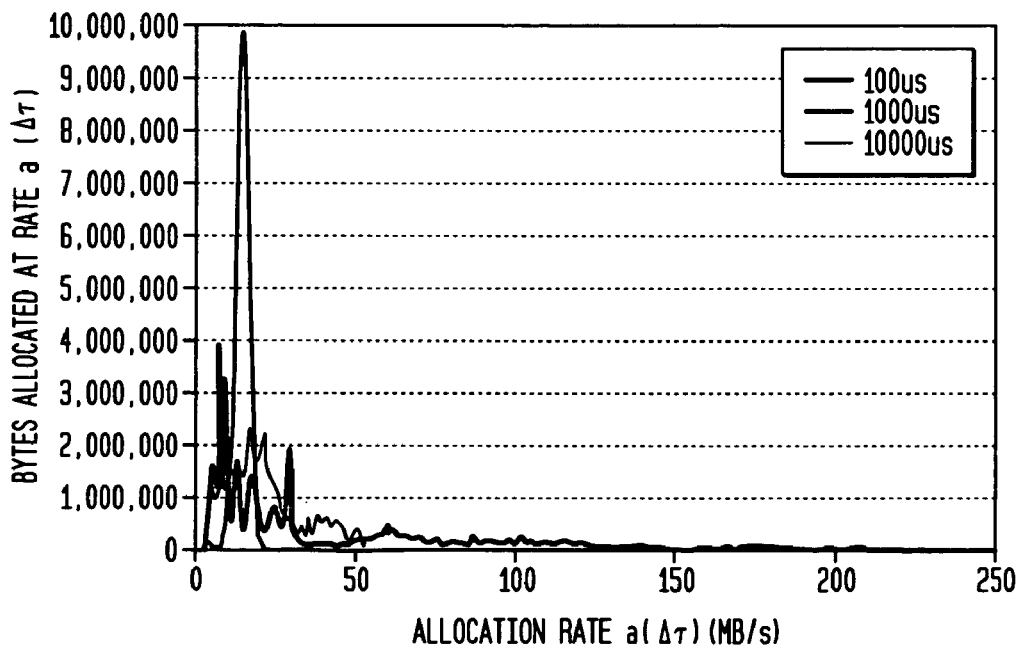

ARRAYLETS (a) PURE FORM: ARRAYOID POINTS TO OUT-OF-LINE ARRAYLETS (b) MIXED FORM: SHORT FINAL ARRAYLET IS STORED INSIDE THE ARRAYOID (c) SHORT FORM ALL ELEMENTS INSIDE ARRAYOID

AVERAGE ALLOCATION RATE a, GENERATIONAL SURVIVAL RATE aη, AND GENERATIONAL SURVIVAL RATE WITH ARRAYLETS FOR THE EEMBC BENCHMARKS WITH A 32KB NURSERY ON A 2.4 GHz PENTIUM

GENERATIONAL REAL-TIME GARBAGE COLLECTION

BACKGROUND OF THE INVENTION

This invention generally relates to the field of automatic memory management, and more specifically, the invention relates to methods and systems for generational real-time garbage collection.

BACKGROUND ART

One of the popular approaches to garbage collection is known as generational garbage collection. It is inspired by an observation, known as the weak generational hypothesis, that most objects die young. A simple generational scheme involves partitioning the heap space into two regions—a nursery (or new generation) and an old generation. All new objects are allocated in the nursery. Most collections, termed minor collections, only reclaim garbage from the nursery. Survivors from a minor collection are promoted to the older generation, which is subjected to collection only during infrequent, major collections.

Garbage collected languages like Java are making significant inroads into domains with hard real-time concerns, such as automotive command-and-control system. However, the engineering and product life-cycle advantages consequent from the simplicity of programming with garbage collection remain unavailable for use in the core functionality of such systems, where hard real-time constraints must be met. As a result, real-time programming requires the use of multiple languages, or at least (in the case of the Real-Time Specification for Java) two programming models within the same language. Therefore, there is a pressing practical need for a system that can provide real-time guarantees for Java without imposing major penalties in space or time.

It is known in the art that it is possible to build a provably real-time garbage collector for a language like Java. A key aspect of this is the use of time-based scheduling instead of the work-based scheduling approach that had been in common use. One such garbage collector is known as the Metronome because it alternates between the mutator and the collector with extremely regular "ticks".

The result was a collector that is able to guarantee a minimum mutator utilization of 50% at a resolution of 10 ms: out of ever 10 ms; the mutator threads receive no less than 5 ms—with no exceptions. During periods when collection is off, the mutators receive almost all of the CPU (a small portion is charged to the collector for things like allocation operations). Collection is active about 45% of the time, resulting in good but not exceptional throughput.

There is significant interest from potential users of this technology. However, it was found that a utilization level of 50% during collection was not acceptable to some users: they wanted more CPU time available for real-time tasks even while garbage collection was active.

Note that this is not a throughput issue, but rather a utilization issue: a constant 20% reduction in utilization was acceptable, while oscillation between 0% and 50% reduction is not.

Unfortunately, it is not desirable to simply spread out the collection more evenly, since this would allow the mutator to allocate more memory while collection is in progress. The increased allocation in turn could cause the memory budget to be exceeded, leading to a failure to meet real-time bounds.

Therefore, there is a clear need for a collector with the same predictability as the Metronome, but with higher utilization and increased throughput—for example, in a production quality JVM, IBM's J9 virtual machine.

SUMMARY OF THE INVENTION

An object of this invention is to provide an improved real-time garbage collection.

Another object of the present invention is to increase the utilization and throughput of a real-time garbage collector.

A further object of the invention is to provide a partial heap garbage collector that, during collection, checks the time remaining, or equivalently the time taken so far, or the work done so far, to complete the partial heap collection.

An object of this invention is to provide an algorithm for generational real-time garbage collection based on synchronous nursery collections, which can significantly increase throughput and reduce memory consumption.

Another object of the present invention is to provide an analytic solution for the achievable utilization of both generational and non-generational garbage collection, allowing the correct collector to be selected for a given set of application and virtual machine parameters.

These and other objectives of the invention are attained with a partial heap garbage collector that during collection checks the time remaining (or equivalently the time taken so far, or the work done so far) to complete the partial heap collection. In a preferred embodiment, the partial heap collection is guaranteed to complete within a fixed time interval. For example, this guarantee may be obtained by applying a worst-case execution time (WCET) and sizing a nursery such that complete evacuation of the nursery can always be achieved on time.

The preferred embodiment of the invention, described in detail below, provides a collector with the same predictability as the Metronome, but with higher utilization and increased throughput. To achieve higher utilization, the invention preferably employs generational collection, which focuses collector effort on the portion of the heap most likely to yield free memory. This has added benefits in a concurrent collector because it reduces the amount of floating garbage, which is typically a drawback of such systems. However, collecting the nursery is unpredictable both in terms of the time to collect it and the quantity of data that is tenured.

Real-time systems are fundamentally different in that heuristic optimizations that are not monotonic cannot be applied. Standard generational collection is not always better; it is merely often better. Furthermore, standard generational collection has no fixed bounds on the time required to collect the nursery. As a result, there are considerable additional complexities that are involved in applying generational techniques to a real-time collector.

Important features of the preferred embodiment of this invention include:

An algorithm for generational real-time garbage collection based on synchronous nursery collection, which can significantly increase throughput and reduce memory consumption;

An analytic solution for the achievable utilization of both generational and non-generational collection, allowing the correct collector to be selected for a given set of application and virtual machine parameters;

Syncopation, a technique for handling temporary spikes in allocation rate that would otherwise make it impossible to evacuate the nursery within the real-time bounds;

Arraylet pre-tenuring, a technique that significantly increases the effective nursery size without increasing the cost of evacuation, thereby increasing utilization and reducing floating garbage; and Measurements of applications showing the potential effectiveness of both syncopation and arraylet pre-tenuring.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 8 shows the maximum mutator allocation rate (MMAR) for six EEMBC benchmark programs.

FIG. 9 is a plot showing peak allocation rates for various allocation intervals.

DETAILED DESCRIPTION OF THE PREFERRED EMBODIMENTS

Figure 1:
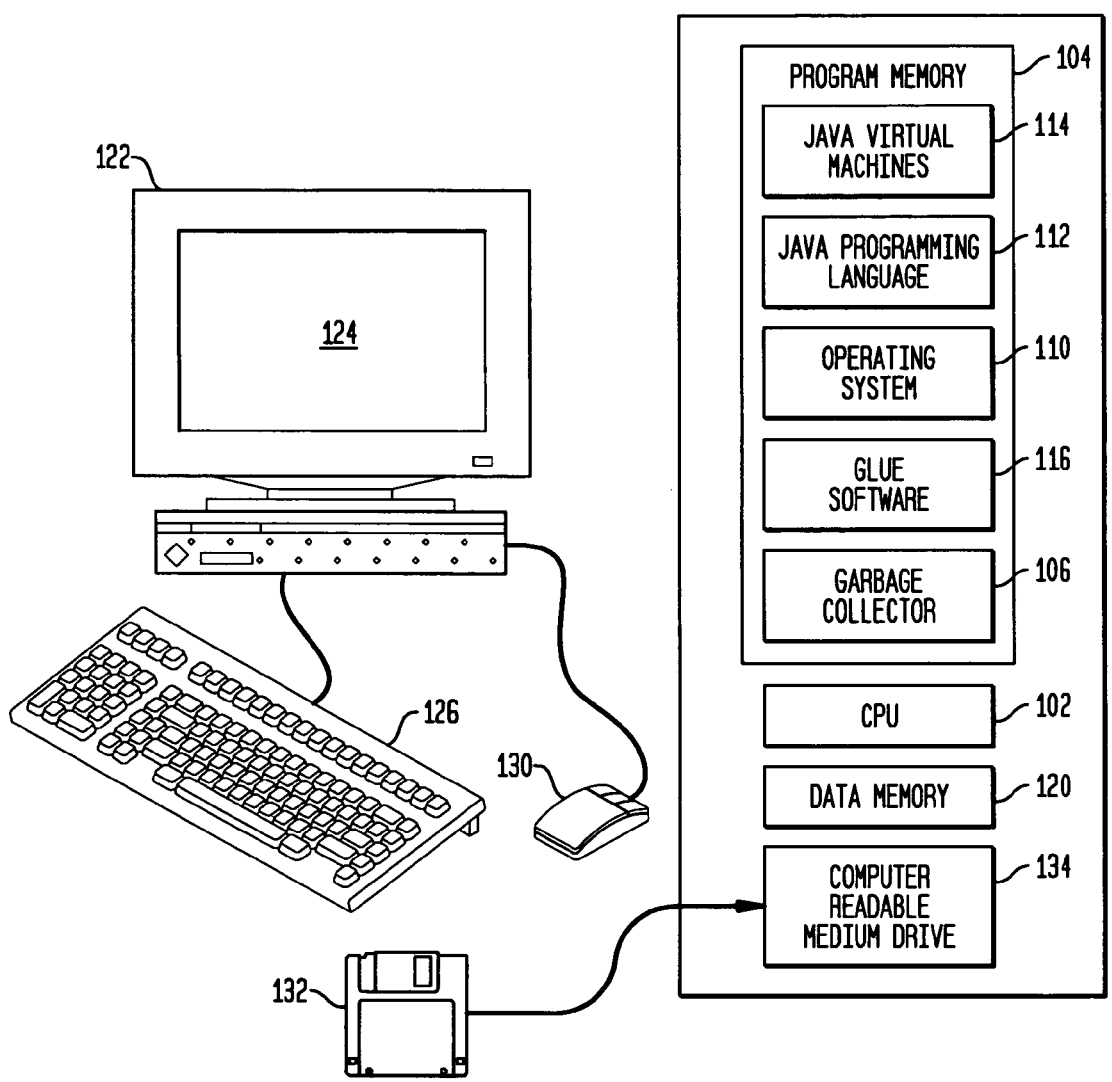
FIG. 1 is a block diagram illustrating a computer system that may be used in the practice of the present invention.
Figure 2:
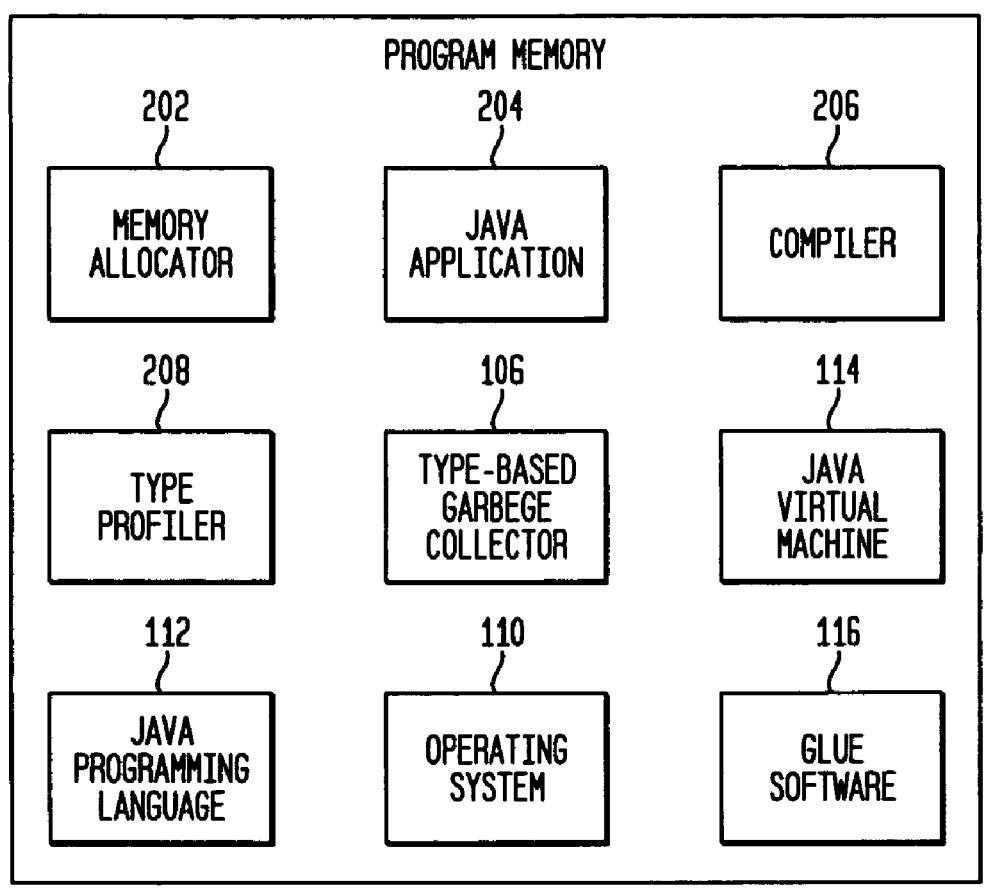
FIG. 2 is a more detailed block diagram showing a program memory of the computer system of FIG. 1.

FIGS. 1 and 2 illustrate, as an example, a computer system 100 which may be used in the practice of this invention. This computer system 100, according to the present example, includes a controller/processor 102, which processes instructions, performs calculations, and manages the flow of information through the computer system 100. Additionally, the controller/processor 102 is communicatively coupled with program memory 104. Included within program memory 104 are a garbage collector 106, operating system platform 110, Java Programming Language 112, Java Virtual Machine 114, glue software 116, a memory allocator 202, Java application 204, a compiler 206, and a type profiler 208. It should be noted that while the present invention is demonstrated using the Java Programming Language, it would be obvious to those of ordinary skill in the art, in view of the present discussion, that alternative embodiments of the invention are not limited to a particular computer programming language.

The operating system platform 110 manages resources, such as the data stored in data memory 120, the scheduling of tasks, and processes the operation of the garbage collector 106 in the program memory 104. The operating system platform 110 also manages a graphical display interface (not shown) that directs output to a monitor 122 having a display screen 124, a user input interface (not shown) that receives inputs from the keyboard 126 and the mouse 130, and communication network interfaces (not shown) for communicating with a network link (not shown). Additionally, the operating system platform 110 also manages many other basic tasks of the computer system 100 in a manner well known to those of ordinary skill in the art.

Glue software 116 may include drivers, stacks, and low level application programming interfaces (API's) and provides basic functional components for use by the operating system platform 110 and by compatible applications that run on the operating system platform for managing communications with resources and processes in the computing system 100.

Each computer system 100 may include, inter alia, one or more computers and at least a computer readable medium 132. The computers preferably include means 134 for reading and/or writing to the computer readable medium 132. The computer readable medium 132 allows a computer system 100 to read data, instructions, messages or message packets, and other computer readable information from the computer readable medium. The computer readable medium, for example, may include non-volatile memory, such as Floppy, ROM, Flash memory, disk drive memory, CD-ROM, and other permanent storage. It is useful, for example, for transporting information, such as data and computer instructions, between computer systems.

The preferred embodiment of the invention provides a collector with the same predictability as the above-discussed Metronome, but with higher utilization and increased throughput. To achieve higher utilization, the invention preferably employs generational collection, which focuses collector effort on the portion of the heap most likely to yield free memory. This has added benefits in a concurrent collector because it reduces the amount of floating garbage, which is typically a drawback of such systems. However, collecting the nursery is unpredictable both in terms of the time to collect it and the quantity of data that is tenured.

Real-time systems are fundamentally different in that heuristic optimizations that are not monotonic cannot be applied. Standard generational collection is not always better; it is merely often better. Furthermore, standard generational collection has no fixed bounds on the time required to collect the nursery. As a result, there are considerable additional complexities that are involved in applying generational techniques to a real-time collector.

Important features of the preferred embodiment of this invention includes:

An algorithm for generational real-time garbage collection based on synchronous nursery collection, which can significantly increase throughput and reduce memory consumption;

An analytic solution for the achievable utilization of both generational and non-generational collection, allowing the correct collector to be selected for a given set of application and virtual machine parameters;

Syncopation, a technique for handling temporary spikes in allocation rate that would otherwise make it impossible to evacuate the nursery within the real-time bounds;

Arraylet pre-tenuring, a technique that significantly increases the effective nursery size without increasing the cost of evacuation, thereby increasing utilization and reducing floating garbage; and Measurements of applications showing the potential effectiveness of both syncopation and arraylet pre-tenuring.

To facilitate an understanding of the present invention, it may be helpful to describe in more detail the algorithm and engineering of the Metronome collector.

The Metronome is a hard real-time incremental uni-processor collector. It uses a hybrid of non-copying mark-sweep collection (in the common case) and copying collection (when fragmentation occurs).

The collector is a snapshot-at-the-beginning algorithm that allocates objects black (marked). While it has been argued that such a collector can increase floating garbage, the worst-case performance is no different from other approaches and the termination condition is deterministic, which is a crucial property for real-time collection.

The Metronome may be implemented in a virtual machine. For typical applications, the virtual machine implementation is real time at 10 milliseconds with 70% minimum mutator allocation. With this arrangement, the collector, without exception, used less than 3 milliseconds in any given 10 millisecond window.

The key elements of the design and implementation of the Metronome collector are:

Time-based Scheduling. The Metronome collector achieves food minimum mutator utilization, or MMU, at high frequencies (1024 Hz) because it uses time-based rather than work-based scheduling simply interleaves the collector and the mutator on a fixed schedule.

Guaranteed Real-time Bounds. Despite the use of time—rather than work-based scheduling, the Metronome is able to tightly bound memory utilization while still guaranteeing good MMU.

Incremental Mark-Sweep. Collection is a standard snapshot-at-the-beginning incremental mark-sweep algorithm implemented with a weak tricolor invariant. Traversal is extended during marking so that it redirects any pointers pointing at from-space so they point at to-space. Therefore, at the end of a marking phase, the relocated objects of the previous collection can be freed.

Segregated Free Lists. Allocation is performed using segregated free lists. Memory is divided into fixed-sized pages, and each page is divided into blocks of a particular size. Objects are allocated from the smallest size class that can contain the object.

Mostly Non-copying. Since fragmentation is rare, objects are usually not moved. If a page becomes fragmented due to garbage collection, its objects are moved to another (mostly full) page containing objects of the same size.

Read Barrier. Relocation of objects is achieved by using a forwarding pointer located in the header of each object. A read barrier maintains a to-space invariant (mutators always see objects in the to-space).

Arraylets. Large arrays are broken into fixed-size pieces (which we call arraylets) to bound the work of scanning or copying an array and to bound external fragmentation caused by large objects.

Metronome only runs on uniprocessors. This choice was made because virtually all embedded systems are uniprocessors and the resulting simplification allows much more efficient implementation. In particular, the Metronome explicitly controls the interleaving of the mutator and the collector.

The term collection is used to refer to a complete mark-sweep-defragment cycle and the term collector quantum is used to refer to a scheduling quantum in which the collector runs.

The Metronome uses time-based scheduling. Most previous work on real-time garbage collection, starting with Baker's algorithm (Baker, H. G. "List processing in real-time on a serial computer," Commun. ACM 21, 4 (April 1978), 280-294), has used work-based scheduling. Work-based algorithms may achieve short individual pause times, but are unable to achieve consistent utilization.

The problem with Baker's definition is that it defines real-time behavior in terms of the collector, rather than the application. Real-time tasks require a guarantee that they can execute to completion in a given (short) interval. Baker's work-based methodology merely provides bounds on individual collector operations, but is unable to bound the CPU consumption of the collector within a given interval. Therefore, completion guarantees cannot be given to the tasks.

This becomes clear when viewed from the perspective of real-time systems methodology. Work-based collectors represent aperiodic event-triggered tasks of varying cost. The combined non-determinism of the events and of their costs results in a worst-case execution time (WCET) that can (and often does) consume the entire real-time period, leaving the application with an MMU of 0.

Previous collectors avoid time-based scheduling out of fear that during periods of heavy allocation, the collector would fall behind and be forced to stop the mutator in order to complete.

The Metronome achieves guaranteed performance provided the application is correctly characterized by the user. In particular, the user must be able to specify the maximum amount of simultaneously live data m as well as the peak allocation rate over the time interval of a garbage collection $a(\Delta G)$. The collector is parameterized by its tracing rate R.

Given these characteristics of the mutator and the collector, the user then has the ability to tune the performance of the system using three inter-related parameters: total memory consumption s, minimum guaranteed CPU utilization u, and the resolution at which the utilization is calculated $\Delta t$.

Figure 3:
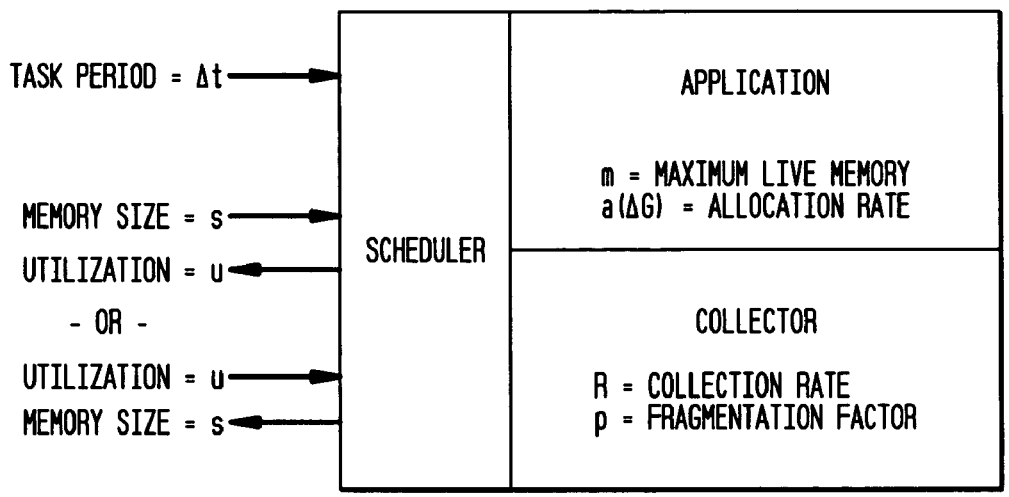
FIG. 3 illustrates the interaction of components in a virtual machine. Parameters of the application and collector are intrinsic; parameters to the scheduler are user-selected and are mutually determinant.

The relationship between these parameters is shown graphically in FIG. 3. The mutator is characterized by its allocation rate over the interval of a garbage collection $a\Delta G$) and by its maximum memory requirement m. The collector is characterized by its collection rate R. The tunable parameters are $\Delta t$, which controls the frequency of collector scheduling, and either the CPU utilization level of the application u thus determining memory size s, or a memory size s, which determines the utilization level u.

Generational Collection

In some cases, the Metronome may not be able to meet an application's real-time utilization requirements. In that case, there are a number of things the programmers can do: they can increase space consumption s by buying more memory; they can decrease the utilization requirement u by buying a faster processor; they can reduce the allocation rate a by rewriting the code to perform less dynamic allocation; or they can reduce the live memory size m by rewriting the code to reduce the size of long-lived data structures.

However, to the greatest possible extent we wish to avoid placing such a burden on the user. Within the system, there are several ways to improve matters: speed up the collection rate R by tuning the collector; decrease m by using various compaction techniques; or decrease the fragmentation factor p by improving the heap architecture and free space management.

Unfortunately none of these techniques is likely to provide the order-of-magnitude improvements that we require. The original Metronome collector has already been fairly well tuned; fragmentation was bounded fairly tightly (12% in theory and 3% in practice); and we have already applied object model compression techniques to the J9 virtual machine in which we are implementing the collector described in this paper.

Figure 4:
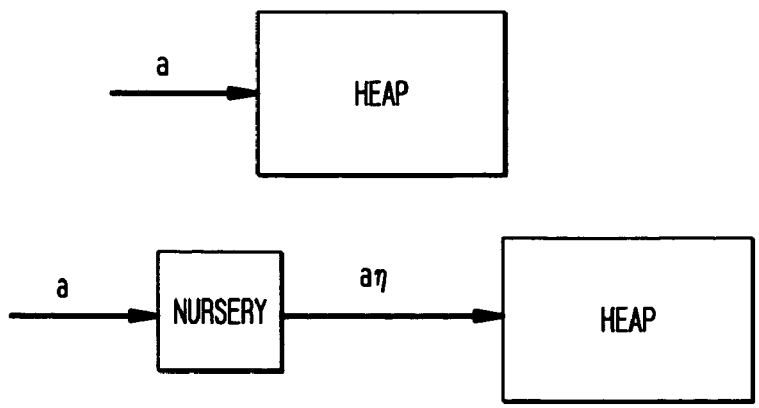
FIG. 4 shows the effects of a nursery on a garbage collection process.

However, there is a way in which we can reduce the allocation rate a. If we employ generational techniques, we can view the nursery as a filter which reduces the allocation rate into the primary heap to $\alpha\eta < a$, as shown in FIG. 4. In general we expect $\eta \ll 1$, which will greatly reduce the load on the main collector. Of course, collecting the nursery will also have a cost, but for most applications we expect that the benefits of reducing the workload on the main collector will normally outweigh these costs by a large margin.

Synchronous Nursery Collection

Typical stop-the-world generational collectors consist of two disjoint collectors: one for the nursery and the other for the tenured (heap) space. Both collectors are usually run with mutators stopped. In a scheme where heap collection is incremental, care must be taken to synchronize with nursery reclamation. Moreover, the incremental collector requires the use of a shapshot write barrier. Therefore, the write barrier must provide both generational and shapshot functionality.

Nursery collection is typically triggered when the nursery is full. In an incremental system mutators can interleave with the collector. Therefore a mutator can evacuate the nursery either when the collector is not running or when the collector is marking or sweeping. In addition, the incremental collector itself evacuates the nursery at the beginning of its root scanning phase. There are three optimizations arising from this step. First, the snapshot write barrier does not need to record the overwriting of nursery to heap pointers. Secondly, during its heap marking phase, the incremental collector does not need to trace nursery objects. Thirdly, we can make sure that we eliminate all of the floating garbage in the nursery. If we choose not to evacuate in the beginning of our collection cycle, then the above optimizations cannot be applied. The incremental collector also performs nursery evacuation at the start of its sweeping phase.

Aside from when nursery evacuation occurs, another effect of combining generational and incremental collectors is the write barrier operation. Although both write barriers protect against the loss of a reachable object, the snapshot and the generational barrier share the following fundamental differences:

Generational barriers are always active, snapshot barriers are partially active: only when the collector is heap marking.

Generational barrier entail objects/region rescanning for pointer fixup, snapshot barriers do not.

Generational barrier remembers the destination object/region, snapshot barriers remember the overwritten pointer.

Generational barrier performs range comparisons to determine whether the new pointer is a heap to nursery one, the snapshot barrier does not perform range checks.

Most pointer stores are nursery to nursery pointers. Since nursery collection is synchronous, we do not require a snapshot write barrier on those pointers. Additionally, since we evacuate the nursery at the start of root set scanning, we also do not need to barrier nursery to heap pointers. Therefore, the common write barrier can now filter on the destination object. That is, if the destination object is in the nursery, we do not need either of the two barriers. For snapshot, we also do not need to barrier heap to nursery pointers, which are needed by generational barrier. Conversely, the snapshot barrier needs to record heap to heap pointers while the generational barrier does not.

Therefore, with this new insight, we can utilize the range checks that the generational write barrier performs on the destination object in order to filter out significant number of shapshot barriers. We note how write barrier operation is connected with the timing of the nursery evacuation.

In a real-time environment, if we are performing synchronous nursery collection then we must be able to compute the worst-case execution time (WCET) for nursery collection. This means carefully bounding all possible sources of work. In particular, the remembered set is also allocated from within the nursery. Objects are allocated left to right, and remembered set entries from right to left. When the two regions meet, the nursery is full and must be collected.

Utility of Generational Collection

To begin with we require a method for determining whether generational collection will provide a benefit. Analytical models, which rely on naïve assumptions about application characteristics naturally, have limited use, but on the other hand the demands of real-time systems require more stringent analysis of performance effects. Since the aim of generational collection is to improve utilization in the real-time interval, it is of little use if generational collection "usually" or even "almost always" improves performance.

Therefore, we have developed an analytical model, discussed below. We characterize the system with the following basic parameters:

a is the allocation rate (bytes/second) assuming infinitely fast garbage collection;

m is the maximum live memory of the mutator (bytes);

N is the nursery size (bytes)

$R_T$ is the tracing rate in the heap (bytes/second);

$R_S$ is the sweeping rate in the heap (bytes/second);

$R_N$ is the collection rate in the nursery (bytes/second);

$\eta$ is the survival ratio in the nursery.

Time and Space Bounds

We characterize the behavior of the system with the following parameters:

$\Delta t$ is the task period (seconds);

u is the minimum mutator utilization in each $\Delta t$;

The allocation rate a and the survival ratio $\eta$ in fact vary considerably. For the time being we will consider the case when they are smooth. Below, we will describe the effect of variations in those parameters, and how the implementation copes with the variations.

For a given interval $\Delta t$, the collector may consume up to $(1-u) \cdot \Delta t$ seconds for collection. We define the garbage collection factor $\gamma$ as the ratio of mutator execution to useful collector work.

$$\gamma = \frac{u \cdot \Delta t}{(1-u) \cdot \Delta t} = \frac{u}{1-u} \qquad (1)$$

Multiplying by $\gamma$ converts collector time into mutator time; dividing does the reverse. Since the relationship between u in the range [0, 1] and $\gamma$ in the range [0, ∞) is one-to-one, we also have $$u = \frac{\gamma}{1+\gamma} \qquad (2)$$

To bound the space required by the collector in order to maintain real-time bounds, we need to know how much extra space may be allocated during a collection cycle. In the absence of generational collection, the extra space $e_M$ for the Metronome is $$e_M = a\gamma \cdot \left(\frac{m}{R_T} + \frac{s}{R_S}\right) \quad (3)$$

which is the allocation rate multiplied by the time required to perform a collection.

Figure 5:
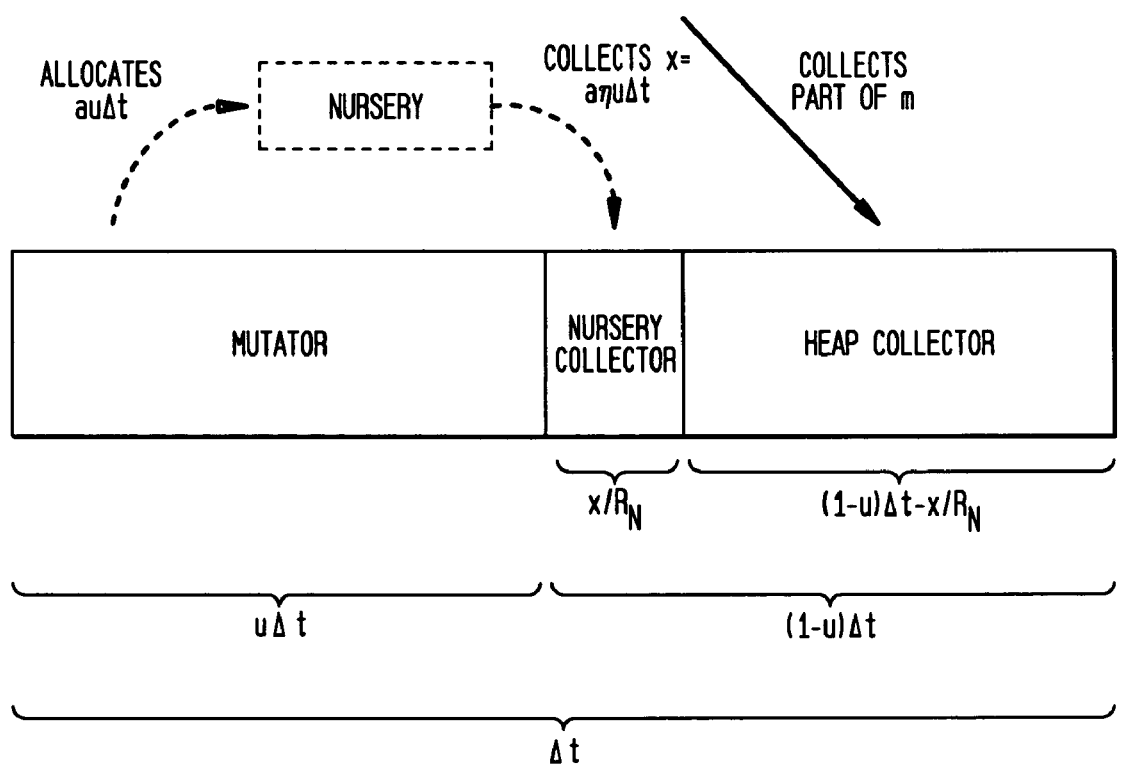
FIG. 5 illustrates the effect of time dilation due to generational collection.

When generational collection is introduced, the allocation is attenuated by the survival rate $\eta$. However, performing generational collection is not free, so it takes longer to collect the main heap. This in turn means that the mutator performs allocation during collection. This effect is shown in FIG. 5, expressed by the following equations, in which we define the generational dilation factor $\delta$ and the corresponding extra space $e_G$ under generational collection:

$$\delta = 1 - \frac{a\eta}{R_N} \cdot \gamma \quad (4)$$

$$e_G = \frac{a\eta\gamma}{\delta} \cdot \left(\frac{m}{R_T} + \frac{s}{R_S}\right) \quad (5)$$

Note: requires that $R_N > a\eta\gamma$.

Freeing an object in our collector may take as man as three collections: (1) the first is to collect the object; (2) the second is because the object may have become garbage immediately after a collection began, and will therefore not be discovered until the following collection cycle—floating garbage; and (3) the third is because we may need to relocate the object in order to make use of its space. The first two properties are universal; the third is specific to our approach.

As a result, the space requirement of our collector paired with a given application is $$s = (m+3e) \cdot (1+p) \quad (6)$$

where $e = e_M$ or $e_G$, and p is the fragmentation factor, which is a settable parameter (we typically use p 1/8). Because the fragmentation factor is uniformly present and because the nursery size N is negligible compared to M, we can simply adopt the fragmentation-free heap-size multiplier formation to measure space expressed by $$\sigma + \frac{s}{m \cdot (1+p)} \quad (7)$$

Substituting equations 3 and 5 into equation 7 gives us the relative space bounds for the original Metronome collector and the generational version.

$$\sigma_M = \frac{R_T R_S + 3a\gamma R_S}{R_T R_S - 3a\gamma R_T} \quad (8)$$

$$\sigma_G = \frac{\delta R_T R_S + 3a\gamma R_S}{\delta R_T R_S - 3a\gamma R_T} \quad (9)$$

These equations show what the space consumption will be for some utilization u since $\gamma$ is a function of u given by equation 1. These equations can be converted to derive what the achievable utilization is given a maximum heap size.

$$u_M = \frac{\sigma_M - 1}{3a\left(\frac{1}{R_T + \frac{1}{R_S}}\right) + \sigma_M - 1} \quad (10)$$

$$u_G = \frac{3a\eta\left(\frac{1}{R_S} + \frac{1}{R_T}\right)\left(1 + \frac{a\eta}{R_N}\right)}{\sigma_G - 1} \quad (11)$$

It is because of the factor of three multiplier that generational collection is so valuable—much more so than in a stop-the-world generational collector. As long as the survival rate $\eta$ is even moderately low, the space required to meet real-time bounds is reduced almost by a factor of $3/\eta$.

It should be noted that the expected space requirement is on the order of m+e, because although the second and third additional collections described above could apply to all objects, in practice they only apply to a very small percentage.

When to Use Generational Metronome

When the survival rate $\eta$ is extremely low, the generational collector will be very effective because the work necessary to maintain available space is also very low. on the other hand, when the survival rate nears 1, the nursery provides no benefit while imposing an extra copy on every allocated object. Intuitively, there is a crossover point when the use of nursery neither helps nor hurts the Metronome. At this point, the space consumption and utilization would be jointly equal. Inspection of equations 8 and 9 reveals that this condition is met when $\eta = \sigma$. A more rigorous derivation, which we omit for conciseness, reveals that there are no other solutions. This crossover condition can be re-formulated to express the crossover utilization $u_C$ given a fixed survival rate, or conversely to give the cross-over survival rate $\eta_C$.

$$u_C = \frac{R_N \cdot (1 - \eta)}{a\eta + R_N \cdot (1 - \eta)} \quad (12)$$

$$\eta_C = \frac{R_N}{R_N + a\eta} \quad (13)$$

Figure 6:
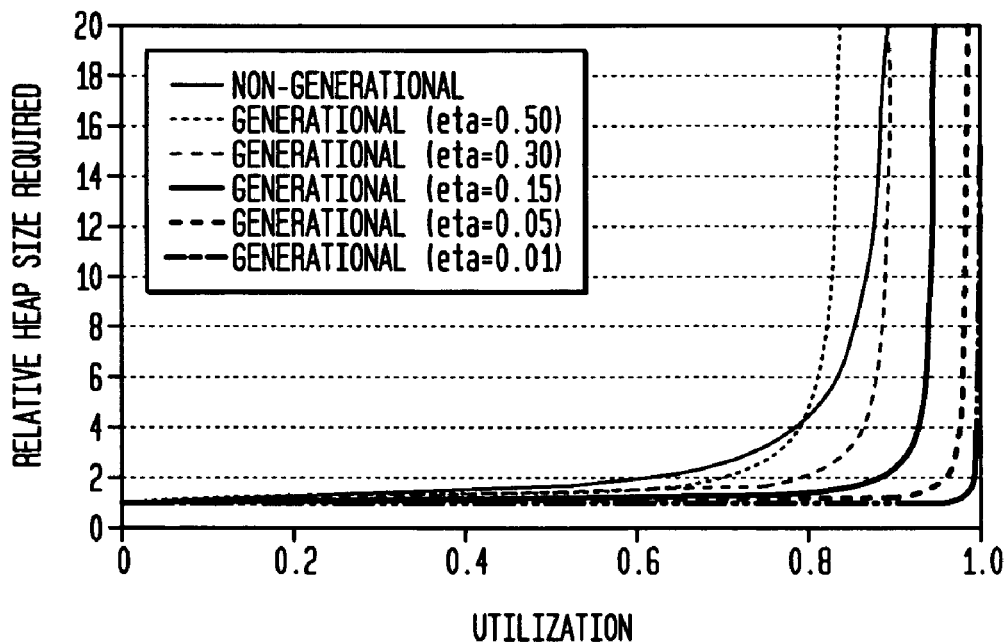
FIG. 6 shows the relationship between relative space usage and utilization at a low allocation rate.
Figure 7:
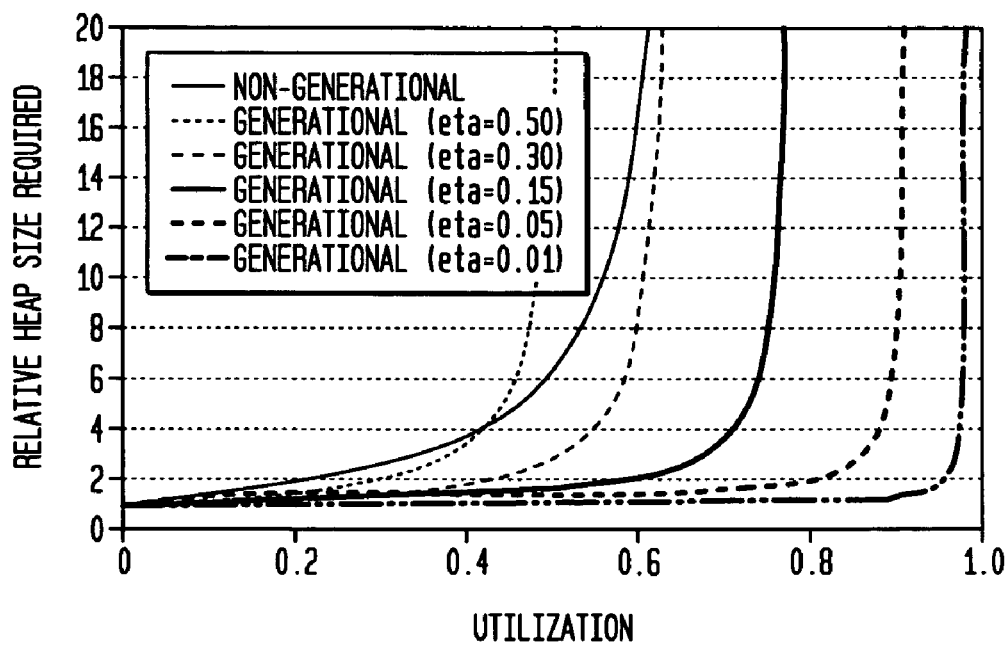
FIG. 7 shows the relationship between relative space-usage and utilization at a high allocation rate.

FIGS. 6 and 7 show the relative heap size required as a function of a target utilization for a low (a=20 MB/s) and high (a=100 Mb/s) allocation rate (see equations 8 and 9). The curves compare the non-generation Metronome against the generational version at several different survival rates. The remaining parameters are fixed: the heap tracing rate $R_T$=150 MB/s, the heap sweeping rate $R_S$=600 MB/s, and the nursery collection rate $R_N$=75 MB/s.

Every curve has the same shape. At low utilizations, the space consumption is low (although for real systems, utilization levels under 50% are unlikely to be acceptable). As the utilization is increased, the space consumption at first increases slowly, reaches an inflection point, and then rises very rapidly. In a generational system, because the nursery collection and the concurrent collection compete for time, the knee in the curve is somewhat sharper than that in the non-generational system. Practically, this means that when using a generational system, care must be taken to avoid running too close to a regime where the space consumption might explode.

When the space consumption spikes, the system is unable to keep up with the allocation rate. In the non-generational version, the sweep rate is throttling the mutator's progress because memory is unavailable for allocation until the desired memory has been swept. In the generational version, the nursery tracing rate (mitigating the survival rate) will throttle the program because the nursery is evacuated synchronously. In either case, when the system falls behind, the memory usage becomes unbounded.

An intuitive and graphically obvious trend in the curves for the generational system is that lower survival rates allow a higher achievable utilization level. On the other hand, when the survival rate is high, the nursery is so ineffective that it will lose to the non-generational version. For example, when the survival rate is 50% and the allocation rate is low, the generational system is able to function at u=0.70 while the non-generational system is able to function at u=0.77.

Syncopation

The analysis of the previous section contains two important (and unrealistic) simplifying assumptions, namely that the allocation rate a and the survival rate η are uniform in each time interval Δt. Since nursery collection is synchronous and the nursery size is tuned to Δt, if the allocation rate spikes temporarily, the nursery will fill more than once per interval Δt and the collector will fall behind the mutator and perform multiple synchronous nursery collections per interval, at which point the desired utilization u can no longer be guaranteed.

The Metronome is able to use time-based scheduling because it requires the application to specify a limit on the allocation rate at the period of the collector. If the real-time interval ΔG is 1 second, then the allocation rate can be averaged over a time interval 1000 times longer. Fundamentally, this allows us to bound the WCET of the collector over its own period, and then divide up that time evenly and schedule it as a time-triggered task.

However, by introducing synchronous collection of the nursery, it would appear that we are doomed to reduce the period over which we can average the allocation rate and survival rate from the collector period down to the real-time interval: while the major heap collector is a long-period task, nursery collection is a high-frequency task. Since it is performed synchronously, it will most likely be the limiting factor on our ability to drive down pause times.

The quality of service provided by a real-time garbage collector is measured by its minimum mutator utilization or MMU, which is the minimum amount of time provided to the mutator in a particular interval.

In order to evaluate the effect of allocation behavior on real-time collection, we define an analogous quantity: maximum mutator allocation rate or MMAR. For a given time interval Δτ, the MMAR of a program is the highest allocation rate of any Δτ-size interval of the program's execution. MMAR must be measured as though garbage collection takes zero time, since otherwise a poorly implemented collector would be subjected to a lower allocation rate.

The MMAR curves of the six EEMBC benchmark programs (EMBEDDED MICROPROCESSOR BENCHMARK CONSORTIUM. Java GrinderBench version 1.0. URL www.eembc.org, 2004) are shown in FIG. 8, for 100 μs≦Δτ≦10 ms. Surprisingly the allocation rate stabilizes very rapidly, between 1 and 3 milliseconds. This shows that if the nursery is able to absorb short-term allocation bursts on the order of a few milliseconds, a synchronous generational collector should be able to provide good utilization (MMU).

However, there is no guarantee that short-term bursts will subside by an y particular point in time, and we also wish to drive the maximum pause times below 1 millisecond. However, as we shorten the time interval, we will begin to encounter intervals in which there is more allocation than can be collected synchronously.

This is shown for the crypto benchmark in FIG. 9: for three different time intervals Δτ=100, 1000, and 10000 μs, we plot the allocation rate in the interval Δτ versus the number of bytes allocated at that rate. As the time scale increases from 100 μs to 10 ms, the tail starts to disappear and the curve shifts to the left, allowing progressively slower collectors to keep up. At 10 ms, the curve has almost degenerated into the single point corresponding to its overall average allocation rate.

There will be some allocation rate above which the nursery collector will not be able to keep up. The area under the curve to the right of the point is the amount of memory that is handled via syncopation.

In music, syncopation is the placement of emphasis on a usually unstressed beat. In our collector, syncopation is the movement of collection work from a stressed interval to an unstressed interval.

When the collector determines that the product of aη is too high, it pre-tenures objects until the allocation rate subsides again.

Syncopation via Allocation Control

We present two alternative approaches to syncopation. In the first we dynamically resize the nursery (virtually, not physically) to ensure that we can still perform a worst-case evacuation of the nursery without violating the mutator utilization requirement. For example, if Δt=10 ms and u=0.7 and if the first nursery collection in the interval consumes 2 ms, then we can still consume 1 ms for collection. If we resize the nursery so that its collection has WCET=1 ms, then the system can proceed safely.

When the nursery becomes too small to be useful (because η→1), we change allocation policy and simply allocate all objects directly in the heap; we call this floodgating. During such a period, the effective allocation rate into the heap will spike form the nursery-attenuated rate aη to the full rate a. The system continues to dynamically monitor the MMU, and when it has risen sufficiently it switches back to a nursery allocation policy.

The advantages of this approach are that it is effective and relatively simple to implement. The disadvantages are that it requires provisioning for the worst case in advance, which means that it can not make full use of available processing resources, and that it can only adapt to variations in a, but not in η. Furthermore, it requires a conditional on the critical path of the inlined allocation sequence, which slows down all allocations.

To understand why floodgating precludes the full use of an available collector quantum, consider the case without floodgating in which we consume a full collector quantum (1−u)Δt to collect the nursery. It is very desirable to be able to do so since it means that we can use the largest possible nursery, which will maximally attenuate η.

However, when we finish collection we have used our full quantum, so we must guarantee that the mutator will run for at least uΔt before any collection takes place. However, there is no bound on the instantaneous allocation rate of the mutator. It could fill the nursery within uΔt/2 time units, at which point we would be forced to synchronously evacuate the nursery and would fail to meet our MMU commitment.

The only alternative is to immediately begin tenuring newly allocated objects and not allow any nursery allocation for uΔt time (or at least uΔt−ε, where ε is a time interval so short that it is impossible for the mutator to fill the memory).

At that point, we perform another collection quantum, and are right back where we started: unable to allocate into the nursery.

The syncopation techniques in and of themselves are fairly simple. The difficulty lies in scheduling them in such a way that MMU requirements are met and memory and processing resources are not squandered.

Because of the pessimistic property of allocation-based syncopation, some over-provisioning is necessary. This is done by increasing the frequency of collection operations within $\Delta t$. continuing our musical analogy, a time interval $\Delta t$ is called a measure, and the sub-divisions of a measure are called beats, of which there must be an integral number. Utilization must be expressed as a number of beats per measure. Taken together, these quantities comprise the time signature of the system.

Since the allocation rate could spike at any time, it is possible that two nursery collections could be forced to happen almost back-to-back. Therefore we retain one beat in reserve. Syncopation occurs when a second, consecutive collector beat consumes that reserve. At that point, allocation changes to immediately tenure all objects until a one-beat reserve has been reclaimed.

In this approach we can also dynamically adapt to changes in the survival ratio $\eta$, because after a nursery collection which does not consume a full beat, we can resize the nursery so that the WCET for its collection is bounded by our remaining fractional beat. Of course, this is not worthwhile below a certain fraction of a beat, since the nursery becomes so small that $\eta \rightarrow 1$, and we are simply implementing a more expensive method of immediate tenuring.

The fundamental limit of such an approach is that it requires that a nursery can be collected within a single beat, which is considerably smaller than the total collector quantum $(1-u)\Delta t$. Thus this approach is limited in its ability to drive down the fundamental time period of the collector. In practice, we find that for our particular hardware and benchmarks, it works well down to a measure length of about $\Delta t=10$ ms, with 10 or 20 beats per measure, requiring a WCET for nursery collection of 500-1000 µs.

Syncopation via Collection Control

The limitations of allocation control give rise to an alternative method of syncopation based on controlling the collection, rather than the allocation.

In this regime, the collector begins collecting the nursery at the beginning of the collector quantum. If it completes collection in time, it resets the nursery and resumes the mutator. However, if the collector quantum expires before nursery collection is complete, it syncopates: it unconditionally tenures the remaining unevacuated objects by logically moving the nursery into the mature space. This is done by appending it to a list of off-beat pages. Then a new nursery is obtained from a pre-allocated reserve and the remembered set buffer is reset. Since all these operations are done logically, by redirecting pointers, syncopation is extremely fast.

This method of syncopation is made possible by the presence of a read barrier in the collector. As the nursery is being collected and objects are moved into the heap, the forwarding pointer that is left behind has the exact same format as the forwarding pointer used to facilitate incremental object movement in the main heap. Therefore, when a partially collected nursery is tenured, heap to nursery references that were stored in the remembered set but not yet fixed will simply follow the forwarding pointer via the read barrier.

The major advantage of collection-based syncopation is that it allows the collector to consume a full mutator quantum, without requiring a change in the allocation policy. If the allocation rate subsides in the subsequent quantum, the collector will immediately regain the full benefits of generational collection.

The primary disadvantage is fragmentation: even if only one object in the nursery is live, none of the memory will be reclaimed until a full collection has taken place. Even worse, since the nursery was allocated sequentially rather than using segregated free lists, it must be completely evacuated before it can be reclaimed, increasing the defragmentation load and making the memory unavailable for one and a half major collection cycles (one to move the live objects, the other to forward any pointers to them).

In the limit, collection-based syncopation degenerates into a semi-space collector, in which all nurseries are syncopated and become the from-space. However, it would be almost impossible to cause this to happen, even with an adversary program.

While syncopation makes it possible to use a full collector quantum for collection, and to allow the nursery to grow to a point beyond its WCET collection limit, it is undesirable to do so. Thus, it may still be desirable to have multiple collector beats per measure, as in allocation-based syncopation, although we expect that significantly fewer beats will be required.

Cost of Syncopation

Syncopation is a technique that allows us to time-average a short-term cost variance by moving the work to a later point in time. Since we have a bound on the long-term allocation rate, we know that any rate spike will be accompanied by a corresponding rate drop within the collector period.

However, at a certain point the variance in the behavior of the mutator is so high that the cost of syncopation will outweigh its benefits. In particular, consider the case when all memory to be allocated in an entire major collection cycle $\Delta G$ is allocated within a single interval $\Delta t$. In that case, the beat generation will contain virtually all of the allocated objects, and we will have received none of the benefits of generational collection even if the program obeys the generational hypothesis.

Variation in the allocation rate and survival rate must be considered together because they drive the load on the nursery collector in concert.

The work performed by nursery collection is linear in the size of the surviving data, so as long as the nursery collection rate $R_N$ is higher than the survival rate $a\eta$, no syncopation is required. However, above that point the survival rate will only be attenuated by $\eta$ the first time the nursery fills up; after that memory will be allocated into the heap at the unattenuated rate a.

For a particular time interval $\Delta t_i$ with allocation rate $a_i$ and survival rate $\eta_i$, the effective allocation rate into the heap $a'_i$ is $$a'_i = \begin{cases} a_i \eta & \text{when } a_i \eta_i \leq R_N \\ a_i - \dfrac{R_N \left( \dfrac{1}{\eta_i - 1} \right)}{\tau} & \text{otherwise} \end{cases} \quad (14)$$

While the extra space cost due to syncopations could be calculated precisely if all $a_i$ and $n_i$ were known, such a specification would be very cumbersome and lack abstraction for the user.

Increasing Mortality

In the previous section we saw that the performance of the system is critically determined by the nursery survival rate η. In this section we describe a technique for decreasing the survival rate by increasing the effective size of the nursery.

Figure 10:
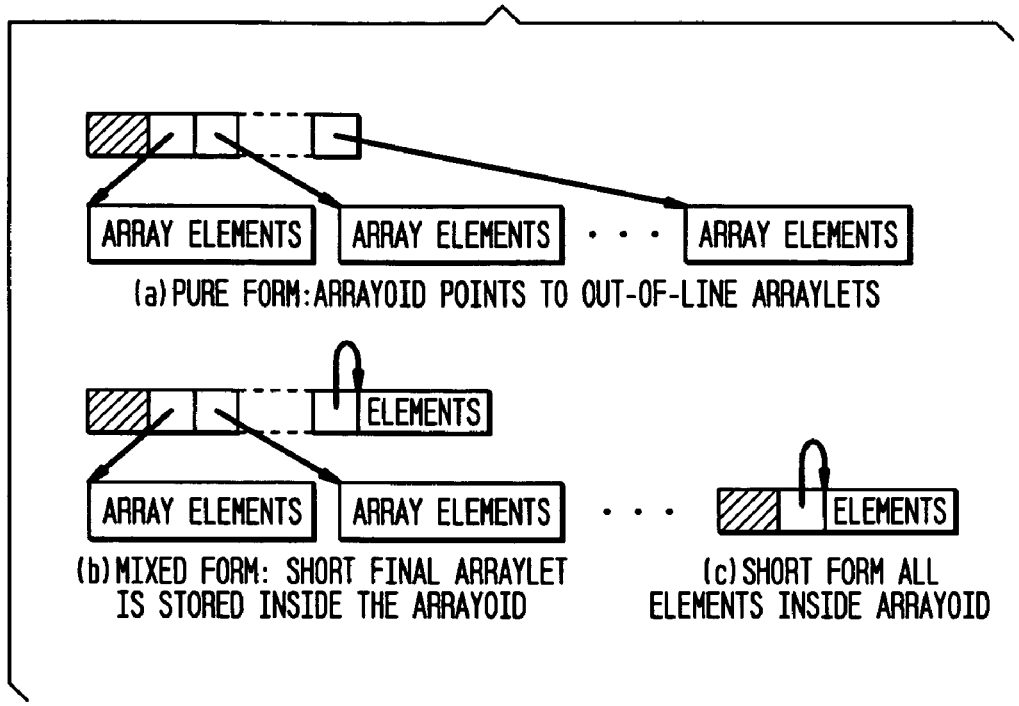
FIG. 10 illustrates memory array elements referred to as arraylets.

In the Metronome, an array consists of two parts: an arrayoid, which contains the object header and pointers to arraylets, which are contiguous aligned chunks of size Σ. If the last arraylet is smaller than the arraylet chunk size minus the arrayoid header size, then it is allocated contiguously with the arrayoid itself. This leads to three basic array organizations, as shown in FIG. 10.

The arraylet size Σ is determined by the page size Π and the desired fragmentation ratio p, such that Σ=pΠ. Maximum immediately allocatable array length is thus limited to ΠΣ/4 (assuming 4 bytes/wrd). In our implementation we use page size Π=16 KB and fragmentation ratio p=1/8, for an araraylet size of Σ=2 KB and a maximum immediately allocateable array length of 8 MB. Larger arrays which may require arbitrarily large contiguous memory must be requested via a potentially blocking interface, which may have to wait up to 2 collection cycles for sufficient contiguous memory to be evacuated and its incoming pointers forwarded.

The mixed arraylet form of FIG. 10(b) is required to maintain the fragmentation bound, since an array of size Σ+1 allocated in the pure form (a) would otherwise consume two arraylets for a fragmentation of 50%. By using the mixed form we can bound the fragmentation by p.

Note that in order to be power-of-two aligned, the arraylets contain no internal metadata; this is kept in the per-page metadata, which must be consulted at page boundaries when parsing the heap.

Arraylet Pretenuring

In a generational system, arraylets have an additional enormous advantage: for most programs they allow the effective size of the nursery to be greatly increased, without increasing either its physical size or the cost of nursery collection.

The mechanism is very simple: arrayoids are allocated in the nursery, while their arraylets are allocated in the heap. As a result, the cost of evacuating the array is just the cost of moving the arrayoid into the heap: the arraylets are not moved, and the arraylet pointers in the arrayoid are unchanged, meaning that no additional pointer forwarding is incurred and the arrayoid can be block-copied.

Arraylets provide an extra level of indirection. Since we already need such a mechanism to avoid external fragmentation, using the indirection for the additional purpose of virtual nursery expansion incurs no additional cost while providing enormous benefits for applications that allocate a significant portion of their space as medium-sided or large arrays.

The "virtual evacuation" of arraylets is not free, and must be charged to the nursery collection. Thus when an arraylet is pretenured the allocation limit for the nursery is reduced, although by much less than it would have been had the entire array had actually been allocated in the nursery.

For arrays of primitive types, the extra cost is almost zero, since in the worst case the object dies and its arraylets must be chained back into a free list.

However, for arrays of pointers, in the worst case all of the elements in the array point to objects in the nursery (whose address will change during evacuation), so each element of the array will have to be forwarded. Thus pointer arraylet allocation would have to be charged at a much higher rate. For simplicity we do not pre-tenure pointer araraylets.

Effectiveness of Arraylet Pre-Tenuring

Figure 11:
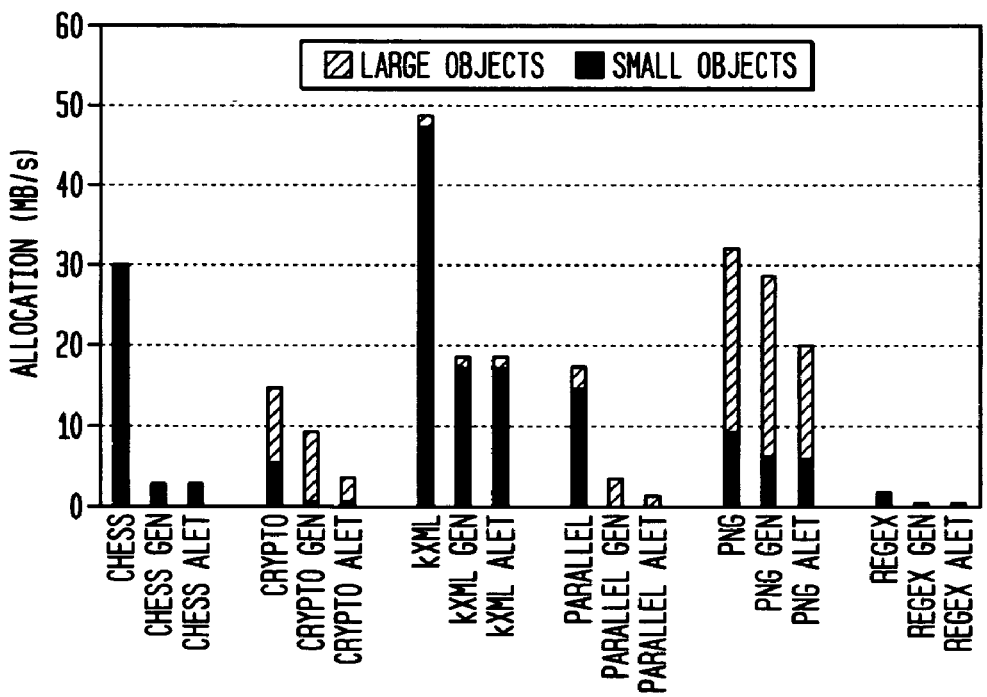
FIG. 11 is a plot showing average allocation rates, generational survival rates, and generational survival rates with arraylets under specified conditions.

FIG. 11 shows the effectiveness, in terms of absolute allocation rate, of arraylet pre-tenuring in our implementation. Absolute rates are shown because they determine the overall utilization that can be achieved.

Of the six benchmarks, three have low survival rates without arraylet pre-tenuring (Chess, Parallel, and Regex). Chess and Regex do not allocate arrays at all, so there can be no further benefit, but they already have very low allocation rates (both relatively and absolutely).

kXML has a moderate survival rate without arraylet pre-tenuring (about 40%), while Crypto and PNG have survival rates so high that generational collection will not be useful.

When arraylet pre-tenuring is applied, it significantly reduces the survival rate of two of the three benchmarks that allocate significant amounts of array data. The effect is particularly dramatic for Crypto, but also significant for Parallel. For PHG, the reduction is significant but the resulting survival rate may still be too high for generational collection to be profitable.

Overall, arraylet pre-tenuring has a significant effect in reducing the allocation rate and increasing the usability of generational collection.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A partial heap garbage collector for managing a memory heap having a nursery portion and a non-nursery portion, the partial heap garbage collector comprising a processor unit including a computer readable processing code, wherein the computer readable processing code, when executing in the processor unit, configures the processor unit for:

collecting data objects in the nursery portion in a defined collection period, said collection period including a plurality of intervals, each of said intervals including a mutator portion and a garbage collector portion;

using time-based scheduling to guarantee that in each of the time intervals, a minimum amount of time is provided for the mutator portion by:

checking, during said collection period, a parameter representing the amount of time or work remaining to complete a defined partial heap collection;

based on the value of said parameter, moving collection work from one of said intervals to another of said intervals to finish a defined partial heap collection within said defined collection period; and changing the capacity of the nursery portion from one nursery collection to the next nursery collection to ensure that said next nursery collection is completed in the defined collection period;

for each of a plurality of arrays of data objects, providing an arrayoid and one or more arraylets, the arrayoid including one or more pointers to said one or more arraylets, each of the arraylets being a continuous section of memory areas, and the arraylet size Σ is determined by the memory page size π and a given fragmentation ratio p, where Σ=pπ;

allocating the arraylets to the non-nursery portion of the memory, including the step of reducing an allocation limit for said nursery portion when one of said arraylets is allocated to said non-nursery portion of the memory using mixed forms of arraylets to bound the fragmentation by ρ; and moving the arrayoids to the non-nursery portion of the memory while keeping said pointers in the arraylets unchanged, to reduce the cost of evacuating the arrays of data objects from the nursery portion of the memory;

wherein said defined partial heap collection is guaranteed to complete within a fixed time interval, and said guarantee to complete the partial heap collection within the fixed time interval is obtained by applying a worst-case execution time (WCET) and sizing the nursery portion whereby complete evacuation of the nursery portion can always be achieved on time.

2. The partial heap garbage collector according to claim 1, wherein the computer readable processing code employs a syncopation via collection control technique to move collection from a stressed interval to an unstressed interval.

3. The partial heap garbage collector according to claim 1, wherein the computer readable processing code employs a syncopation via collection control technique to move collection from a stressed interval to an unstressed interval.

4. The partial heap garbage collector according to claim 1, wherein said collecting is done by a tracing partial heap collector including computer readable processing code for discovering live data by tracing a subset of all live objects.

5. A partial heap garbage collection method for managing a memory heap having a nursery portion and a non-nursery portion, the nursery portion having a variable capacity, said method comprising the steps of:

collecting data objects in the nursery portion in a defined collection period, said collection period including a plurality of intervals, each of said intervals including a mutator portion and a garbage collector portion;

using time-based scheduling to guarantee that in each of the time intervals, a minimum amount of time is provided for the mutator portion by:

checking, during said collection period, a parameter representing the amount of time or work remaining to complete a defined partial heap collection;

based on the value of said parameter, moving collection work from one of said intervals to another of said intervals to finish a defined partial heap collection within said defined collection period; and changing the capacity of the nursery portion from one nursery collection to the next nursery collection to ensure that said next nursery collection is completed in the defined collection period;

for each of a plurality of arrays of data objects, providing an arrayoid and one or more arraylets, the arrayoid including one or more pointers to said one or more arraylets, each of the arraylets being a continuous section of memory areas, and the arraylet size $\Sigma$ is determined by the memory page size $\pi$ and a given fragmentation ratio ρ, where $\Sigma = \rho \pi$;

allocating the arraylets to the non-nursery portion of the memory, including the step of reducing an allocation limit for said nursery portion when one of said arraylets is allocated to said non-nursery portion of the memory using mixed forms of arraylets to bound the fragmentation by ρ; and moving the arrayoids to the non-nursery portion of the memory while keeping said pointers in the arraylets unchanged, to reduce the cost of evacuating the arrays of data objects from the nursery portion of the memory;

wherein said defined partial heap collection is guaranteed to complete within a fixed time interval, and said guarantee to complete the partial heap collection within the fixed time interval is obtained by applying a worst-case execution time (WCET) and sizing the nursery portion whereby complete evacuation of the nursery portion can always be achieved on time.

6. The method according to claim 5, wherein the collecting step includes the step of employing a syncopation via allocation control technique to move collection work from a stressed interval to an unstressed interval.

7. The method according to claim 5, wherein the collecting step includes the step of employing a syncopation via collection control technique to move collection from a stressed interval to an unstressed interval.

8. The method according to claim 5, wherein said collecting includes the step of performing a tracing partial heap collection including discovering live data by tracing a subset of all live objects.

9. A method of memory management comprising the steps of:

providing a memory heap having a nursery portion and a non-nursery portion, the nursery portion having a variable capacity;

collecting data objects in the nursery portion in a defined collection period having a plurality of intervals, each of said intervals including a mutator portion and a garbage collector portion;

using time-based scheduling to guarantee that in each of the time intervals, a minimum amount of time is provided for the mutator potion by:

changing the capacity of the nursery portion from one nursery collection to the next nursery collection to ensure that said next nursery collection is completed in the defined collection period;

for each of a plurality of arrays of data objects, providing an arrayoid and one or more arraylets, the arrayoid including one or more pointers to said one or more arraylets, and each of the arraylets being a contiguous section of memory areas, and the arraylet size is determined by the memory page size $\pi$ and a given fragmentation ratio ρ, where $\Sigma = \rho \pi$;

allocating the arraylets to the non-nursery portion of the memory, including the step of reducing an allocation limit for said nursery portion when one of said arraylets is allocated to said non-nursery portion of the memory;

allocating the arrayoids into said nursery portion;

evacuating the arrayoids from the nursery portion of the memory by moving the arrayoids into the non-nursery portion of the memory without changing any of the pointers of the arrayoids to reduce the cost of evacuating the arrayoids from the nursery portion of the memory heap; and using mixed forms of arraylets to bound the fragmentation by ρ;

whereby allocating the arraylets to said non-nursery portion increases the effective size of said nursery portion without increasing either the physical size of said nursery portion or the cost of nursery collection.

10. The method according to claim 9, comprising the further step of performing a generational garbage collection to determine which ones of said arraylets are allocated to said non-nursery portion of the memory.

11. A system for computer memory management, for use with arrays of data objects, each of said arrays including an arrayoid and one or more arraylets, the arrayoid of the array including one or more pointers to the one or more arraylets of the array, and each of the arraylets being a contiguous section of memory areas, the system comprising:

a memory heap having a nursery portion and a non-nursery portion, the nursery portion having a variable capacity;

an allocator for allocating the arraylets to the non-nursery portion of the memory, and for allocating the arrayoids into said nursery portion, by reducing an allocation limit for said nursery portion when one of said arraylets is allocated to said non-nursery portion of the memory, wherein the arraylet size $\Sigma$ is determined by the memory page size $\pi$ and a given fragmentation ratio $\rho$, where $\Sigma=\rho\pi$;

a collector for using time-based scheduling to evacuate the arrayoids from the nursery portion of the memory by moving the arrayoids into the non-nursery portion of the memory without changing any of the pointers of the arrayoids to reduce the cost of evacuating the arrayoids from the nursery portion of the memory heap; and by changing the capacity of the nursery portion from one nursery collection to the next nursery collection to ensure that said next nursery collection is completed in the defined collection period;

using mixed forms of arraylets to bound the fragmentation by $\rho$;

wherein the allocator reduces an allocation limit for said nursery portion when one of said arraylets is allocated to said non-nursery portion of the memory, and whereby allocating the arraylets to said non-nursery portion increases the effective size of said nursery portion without increasing either the physical size of said nursery portion or the cost of nursery collection.

12. The system according to claim 11, further comprising a generational garbage collector to determine which ones of said arraylets are allocated to said non-nursery portion of the memory.

13. A program storage device readable by machine, tangibly embodying a program of instructions executable by the machine to perform method steps for a partial heap garbage collection for managing a memory heap having a nursery portion and a non-nursery portion, the nursery portion having a variable capacity, said method steps comprising:

collecting data objects in the nursery portion in a defined collection period, said collection period including a plurality of intervals, each of said intervals including a mutator portion and a garbage collector portion;

using time-based scheduling to guarantee that in each of the time intervals, a minimum amount of time is provided for the mutator portion by:

checking, during said collection period, a parameter representing the amount of time or work remaining to complete a defined partial heap collection;

based on the value of said parameter, moving collection work from one of said intervals to another of said intervals to finish a defined partial heap collection within said defined collection period; and changing the capacity of the nursery portion from one nursery collection to the next nursery collection to ensure that said next nursery collection is completed in the defined collection period;

for each of a plurality of arrays of data objects, providing an arrayoid and one or more arraylets, the arrayoid including one or more pointers to said one or more arraylets, each of the arraylets being a continuous section of memory areas, and the arraylet size $\Sigma$ is determined by the memory page size $\pi$ and a given fragmentation ratio p, where $\Sigma=\rho\pi$;

allocating the arraylets to the non-nursery portion of the memory, including the step of reducing an allocation limit for said nursery portion when one of said arraylets is allocated to said non-nursery portion of the memory using mixed forms of arraylets to bound the fragmentation by $\rho$; and moving the arrayoids to the non-nursery portion of the memory while keeping said pointers in the arrayoids unchanged, to reduce the cost of evacuating the arrays of data objects from the nursery portion of the memory;

wherein said defined partial heap collection is guaranteed to complete within a fixed time interval, and said guarantee to complete the partial heap collection within the fixed time interval is obtained by applying a worst-case execution time (WCET) and sizing the nursery portion whereby complete evacuation of the nursery portion can always be achieved on time.

14. The program storage device according to claim 13, wherein:

the collecting step includes the step of employing a syncopation via allocation control technique to move collection work from a stressed interval to an unstressed interval.

15. The program storage device according to claim 13, wherein:

the collecting step includes the steps of i) employing a syncopation via collection control technique to move collection from a stressed interval to an unstressed interval, and ii) performing a tracing partial heap collection including discovering live data by tracing a subset of all live objects.

* * * * *